B. THOMPSON.
Sleigh Runner for Wheeled Vehicles.
No. 75,812. Patented March 24, 1868.
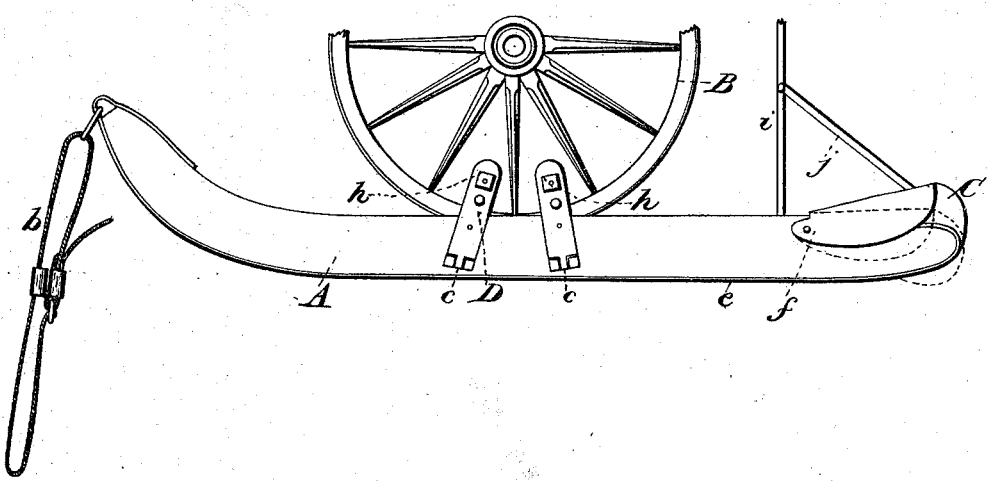
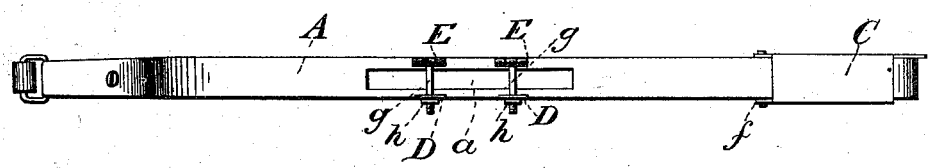
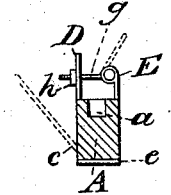
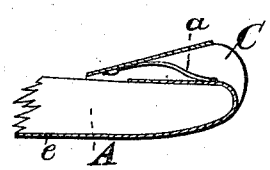
Witnesses:
Inventor:
Bjarne Thompson

United States Patent Office.

BJARNE THOMPSON, OF CHICAGO, ILLINOIS.

Letters Patent No. 75,812, dated March 24, 1868.

IMPROVED RUNNERS FOR WHEELED VEHICLES.

The Schedule referred to in these Letters Patent and making part of the same.

TO ALL WHOM IT MAY CONCERN:

Be it known that I, BJARNE THOMPSON, of Chicago, Cook county, State of Illinois, have invented certain new and useful Improvements in Runners for Wheeled Vehicles; and I do declare that the following is a full, clear, and exact description of the construction and operation of the same, reference being had to the accompanying drawings making a part of this specification, in which—

Figure 1 is a side view of my runner, with a wheel in position.

Figure 2, a top view.

Figure 3, a cross-section on red line $x\ y$.

Figure 4, a longitudinal section showing the guide.

Like letters refer to like parts in all the figures.

The objects of my invention are to construct runners to which wheeled vehicles may be readily attached for use, without removing the wheels, and to provide a guide to prevent the sliding of the runners in dangerous places, the guide being under the control of the driver.

To enable others skilled in the art to make and use my improvements, I describe their construction and operation.

A represents the runner, which may be made about three inches wide and two and one-half inches thick, and of the usual form. In the top of the runner I cut a recess, $a$, to receive the wheel. On one side of the runner I place the irons E E, and on the opposite side the irons D D, at the proper places, to be used with the bolts or cross-bars $g\ g$, to hold the wheel securely in place. As shown in the drawings, D is hinged at $e$, and the cross-bar or rod $g$ is hinged to the top of E. D is provided with one or more holes, through which the rod $g$ passes. These several parts, in size and other respects, must be adapted to the size of the wheel to be used. In use, the wheel is placed in the recess $a$ in the top of the runner, the iron, D, being first put back, and the rod $g$ thrown up, as indicated by dotted lines in fig. 3. These irons are then brought to place, $g$ being passed through D and secured by the nut $h$, as shown. In the drawings the rods $g$ are located too high. Pieces of iron of suitable size may be bolted or otherwise properly fastened to the runner, the ends passing above the same, and provided with holes to receive a bolt, and an ordinary bolt and nut may be used to secure the wheel in place. The runner may be shod with iron, $e$, as usual. A strap, $b$, is used with each runner, to be attached to some part of the vehicle in a suitable manner. The runner, as shown in the drawings, is designed to be used with a single wheel, four being used with a four-wheeled vehicle; but, if desired, the runners may be made of such length that only two will be required for a four-wheeled vehicle, in which case each runner must be provided with two sets of fastening-irons. I also provide one of the runners with a guide, C, being a piece of metal, bent at right angles, one part passing over the top of the runner, the other being at the side, and pivoted to the runner at $f$, as shown. When not in use it is held up from the ground by the spring $d$, fig. 4. That part of this piece of metal at the side of the runner is of such width that when pressed down it will rest on and enter the ground.

This guide C is operated by the levers $i\ j$, attached to the runner and guide, as shown, and are so arranged as to be under the control of the driver. By means of these levers the guide C can be thrown down to the ground to prevent the sliding of the runners when desired. When four runners are used, the guide should be placed on one of the rear runners.

Having thus described my invention, what I claim as new, and desire to secure by Letters Patent, is—

1. The hinged stirrups D and bolts $g$, in combination with a detachable runner, having in it a groove or recess fitted to the wheel, substantially as specified.

2. The guide C, to prevent the side slipping off the runner when operated by the direct action of the lever $i\ j$, substantially as specified.

BJARNE THOMPSON.

Witnesses:
L. L. BOND,
E. A. WEST.